(12) United States Patent
Mahieu et al.

(10) Patent No.: US 7,942,369 B2
(45) Date of Patent: May 17, 2011

(54) WINDSCREEN FRAME AND A METHOD OF PRODUCTION FOR A WINDSCREEN FRAME

(75) Inventors: Benjamin Mahieu, Toulouse (FR); Bruno Cacciaguerra, Clermont le Fort (FR); Louis Peltier, Ramonville Saint Agne (FR)

(73) Assignee: Souriau, Versailles (FR)

( * ) Notice: Subject to any disclaimer, the term of this patent is extended or adjusted under 35 U.S.C. 154(b) by 751 days.

(21) Appl. No.: 11/854,677

(22) Filed: Sep. 13, 2007

(65) Prior Publication Data
US 2008/0073931 A1    Mar. 27, 2008

(51) Int. Cl.
*B64C 1/14* (2006.01)
(52) U.S. Cl. ........... 244/129.3; 244/119; 244/121; 296/96.21; 52/656.5
(58) Field of Classification Search ........ 244/129.3, 244/121, 119, 120, 129.1; 296/96.21, 84.1, 296/201, 190.1; 52/204.1, 204.5, 204.6, 52/208, 656.2
See application file for complete search history.

(56) References Cited

U.S. PATENT DOCUMENTS

| 2,464,696 | A | * | 3/1949 | Lelong ..................... 296/201 |
| 2,547,799 | A | * | 4/1951 | Wernig ................. 296/96.21 |
| 2,827,671 | A |   | 3/1958 | Martin |
| 3,259,345 | A | * | 7/1966 | Martignoni et al. ........ 244/129.3 |
| 3,429,530 | A | * | 2/1969 | Hertel ................... 244/129.3 |
| 4,004,388 | A |   | 1/1977 | Stefanik |
| 4,973,103 | A | * | 11/1990 | Imajyo et al. ........... 296/203.04 |
| 5,037,041 | A | * | 8/1991 | Unterhitzenberger ........ 244/120 |
| 5,299,396 | A | * | 4/1994 | Rap et al. ..................... 52/90.1 |
| 5,362,120 | A | * | 11/1994 | Cornille, Jr. ............. 296/203.01 |
| 5,927,364 | A | * | 7/1999 | Zacher et al. .................... 160/90 |
| 6,736,352 | B2 | * | 5/2004 | Bladt et al. ............... 244/129.3 |
| 2005/0082432 | A1 |   | 4/2005 | Nordman |
| 2006/0080914 | A1 | * | 4/2006 | Wood et al. ................. 52/204.5 |

FOREIGN PATENT DOCUMENTS

DE  10 2004 012 374 A1  10/2005
WO  2004011249 A1  2/2004

* cited by examiner

*Primary Examiner* — Joshua J Michener
(74) *Attorney, Agent, or Firm* — Perman & Green, LLP

(57) ABSTRACT

A windscreen frame, and a method of production for a windscreen frame, designed to hold a windscreen in an opening in a wall, the frame including at least one upper horizontal frame section element, at least one lower horizontal frame section element and at least one vertical mounting, characterized in that it is a single unit in composite material.

11 Claims, 4 Drawing Sheets

WINDSCREEN FRAME AND A METHOD OF PRODUCTION FOR A WINDSCREEN FRAME

BACKGROUND

1. Field

The disclosed embodiments concern a windscreen frame designed for a windscreen in an opening of a wall. More precisely, the disclosed embodiments concerns a frame for a windscreen in a composite material. The disclosed embodiments also concern an aircraft cockpit fitted with such a windscreen frame. The disclosed embodiments also concern a method of production for a frame for a windscreen in a composite material.

The disclosed embodiments are for use in cases where it is necessary to close, using a glass, an opening in a wall, and most particularly in the wall of a vehicle such as an automobile or an aircraft.

2. Brief Description of Related Developments

Currently, in the field of aeronautics, it is known to fit the front part of an aircraft, formed by the cockpit in which pilots and co-pilots are installed, with a windscreen. The windscreen permits pilots and co-pilots to see what is happening outside and in front of the aircraft. The windscreen is held fixed in the wall of the cockpit through the use of a specific framework. Because of its frontal position and the operating conditions of the aircraft, the windscreen frame and windscreen must be capable of taking up the load of pressurisation and birdstrike. The windscreen frame must rigidify the opening in the wall. The windscreen must in addition ensure perfect airtightness between the exterior and the interior of the cockpit. The liaison between the windscreen frame and the windscreen in one part and between the windscreen frame and the wall in another part must be airtight.

Currently, windscreen frames are made which comprise metal frame fittings which perform the function of glass support and metal frame section fittings which rigidify of the opening. These metal fittings are most often made of thick aluminium alloy plates, or of titanium alloy. Each of these metal fittings is independent from the others and they are assembled and bolted to each other to form the desired windscreen frame.

Currently, in order to make a windscreen frame, it is therefore necessary to manufacture each of the supporting parts for a specific elementary function of the windscreen frame, and then subsequently perform the assembly of these parts. The disadvantage of such a windscreen frame is that it requires the creation of numerous, complicated shapes which subsequently require a precise and laborious assembly. In addition, these parts must very often be machine finished, meaning that the manufacturing time and the cost of such a frame are increased. In addition, it is necessary to constantly monitor the integrity of the windscreen, in particular to ensure that the various parts continue to cooperate and fulfil their specific functions during the repetitive and successive uses of the aircraft.

Currently, in the aeronautics field, it is sought to reduce the global mass of aircraft, by making the majority of the aircraft parts in composite material. In the case where the fuselage of the aircraft, and more particularly its cockpit, is made in composite material, the fitting of a metal windscreen frame causes carbon/metal interface problems. In effect, problems of thermal dilation compatibility exist in the case of aluminium, difficulties of mixed drilling in the case of titanium and corrosion problems in general.

SUMMARY

In the disclosed embodiments, it is sought to provide a windscreen frame which is of simple conception and which is easy to fit into a wall, particularly a wall in composite material. In addition, it is sought to reduce the global mass of such a windscreen frame.

In order to do this, in one embodiment, the creation of a single unit windscreen framework in composite material is proposed. The term single unit is understood to mean that the windscreen frame is made of one single same part. It is not necessary to assemble, particularly using nuts and bolts, the sub-elements of the windscreen. The group of sub-elements of the windscreen according to the disclosed embodiments are included in the mass of the said windscreen. The windscreen frame according to the disclosed embodiments integrates the glass support functions, mechanical resistance to pressurisation and birdstrike, as well as rigidifying the cut-outs, that is to say the opening in the wall in its structure. The rigidifying and load take up functions of the glass are no longer dissociated but integrated into one single and same part. The creation of the frame in one single piece means that assembly operations can be eliminated. The windscreen frame according to the disclosed embodiments is made up of sub-groups forming the support elements, each of these sub-groups being able to be obtained from a specific preform. The necessary preforms are made for the desired embodiment of the windscreen frame, and then they are placed in the required position before being irreversibly amalgamated in order to form a single unit. The windscreen frame according to the disclosed embodiments comprises horizontal support elements and vertical support elements, each of the support elements integrating the functions of glass support and load take up of pressurisation and birdstrike.

The disclosed embodiments are generally directed to a windscreen frame, designed to hold a windscreen in an opening in a wall, the frame comprising at least one upper horizontal frame section element, at least one lower horizontal frame section element and at least one vertical mounting, characterised in that it is a single unit in composite material.

The windscreen frame according to the disclosed embodiments thus integrates the glass support functions and the rigidifying of the opening. More precisely, the group of these functions is found in each section of the frame.

In one particular example, the windscreen frame comprises five vertical mountings, in a way which divides the opening in the wall into four holes, each of these holes being closed by a glass.

In one particular embodied example of the disclosed embodiments, the vertical mounting of the windscreen frame comprises a vertical central bar and a glass support structure, the said vertical central bar being at least partially enveloped in the glass support structure.

The vertical central bar rigidifies in flexion and tension the structure forming the vertical mounting. The vertical bar also rigidifies the opening in the wall.

The support structure of the glass provides support for the glass, but also takes up the load of pressurisation and birdstrike.

Thus, through the vertical bar and the glass support structure, the vertical mounting of the windscreen frame integrates the group of functions necessary to a windscreen frame.

Similarly, it is possible to make all or part of the horizontal frame sections of the windscreen frame according to the disclosed embodiments in such a way that they comprise a horizontal central longeron and a glass support structure, positioned in order that the glass support structure envelopes at least partially the said horizontal central longeron.

The horizontal central longeron, like the vertical central bar of the vertical mounting, rigidities the whole structure forming the horizontal frame section, whilst the glass support structure permits the glass to be held and to mechanically withstand pressurisation and birdstrike.

Thus, through the horizontal longeron and the glass support structure, the horizontal frame section element of the windscreen frame integrates the group of functions necessary to a windscreen frame.

In addition, it is possible to coat two opposite faces of the vertical mounting and/or the horizontal frame section element according to the disclosed embodiments, respectively with an external skin and an internal skin, designed to rigidify in flexion by extending along the wall in which the opening is formed. The skins ensure the cohesion of the whole of the frame respectively with the external face and the internal face of the wall concerned.

In a first mode of embodiment of the glass support structure according to the disclosed embodiments, it is possible to make provision for it to include at least one flange having a Z-shaped section, one branch of the Z forming a support plate on which the windscreen is designed to sit. The support plate is able to take up the load of birdstrike which impact on the windscreen.

In another example of an embodiment, the flange of the glass support structure has a U-shaped transverse section, one branch of the U forming a main support plate on which the windscreen is designed to sit. There also, the main support plate is able to take up the load of birdstrike.

In preference, the surfaces of the flange are coated respectively by an external skin and an internal skin, designed to extend along the wall in which the opening is formed, the external and/or the internal skin forming an auxiliary support plate on which the windscreen is designed to sit. Therefore, in the zone in question, the windscreen is supported by two layered support plates.

In the frame according to the disclosed embodiments, each vertical mounting is integral by one top end of an upper horizontal frame section and by a bottom end of a lower horizontal frame section. The liaison between one end of the vertical mounting and one horizontal frame section form a junction point, through which runs the vertical central bar of the vertical mounting. The vertical central bar of the vertical mounting in addition also runs through the horizontal frame section which it crosses, in order to rigidify the whole of the junction point structure.

In addition, in order to increase the rigidity of the junction point, it is possible to make provision for a stiffener, housed in the internal space of the junction point. The stiffener applies against, in one part, the vertical central bar and, in another part, an internal wall of the junction point.

In preference, the junction point is fitted with two stiffeners encasing the vertical central bar.

The disclosed embodiments also concerns an aircraft cockpit comprising at least one windscreen frame. In preference, the aircraft cockpit is made in composite material.

The disclosed embodiment also concerns a method of production of a single unit windscreen frame in composite material, the frame comprising at least one upper horizontal frame section element, at least one lower horizontal frame section element and at least one vertical mounting, comprising:
    preforms are made in a composite material, representing sections of horizontal frame section elements and sections of vertical mountings;
    the preforms are positioned in a mould;
    resin is injected into the mould to form cohesion between the group of preforms in such a way as to obtain a single unit windscreen frame.

According to the examples of implementation of the method according to the disclosed embodiments, it is possible to make provision for all or some of the following additional steps:
    an internal skin is placed against a wall of the mould designed to hold the preforms, before positioning the said preforms in the said mould, then the group of preforms are coated with an external skin, so that the internal and the external skins encase the preforms in the mould, then coinjection is carried out in order to form a single unit of the group in which the internal and external skins encase the horizontal frame section elements and the vertical mountings.

The term coinject is understood to mean that the resin is injected into the mould to form cohesion of the group.

BRIEF DESCRIPTION OF THE DRAWINGS

The disclosed embodiments will be more easily understood when reading the following description and studying the accompanying drawings. These are presented as an indication and are not limitative to the disclosed embodiments. The figures represent.

DETAILED DESCRIPTION OF THE PREFERRED EMBODIMENTS

Figure 1:
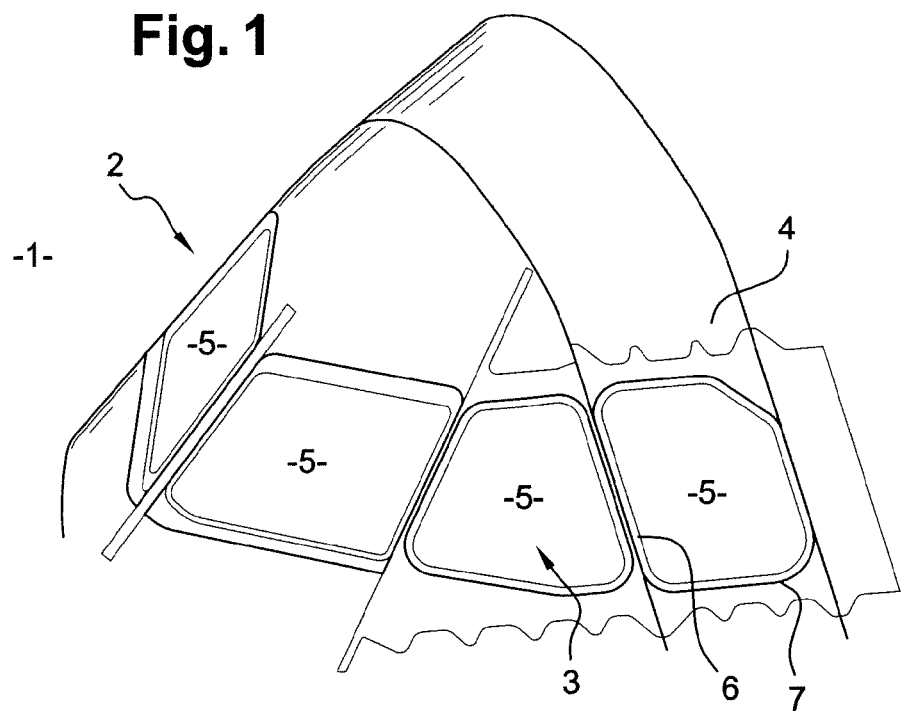
FIG. 1: a schematic representation of an aircraft cockpit fitted with a state of the art windscreen frame.

On FIG. 1, a partial representation can be seen of an aircraft cockpit 1 fitted with a state of the art windscreen frame 2. The windscreen frame 2 subdivides the opening 3 in the wall 4 of the cockpit 1 into six holes 5, in each of which a glass is to be fitted. Each hole 5 is rigidified by vertical mounting elements 6 and horizontal frame section elements 7. The vertical mounting elements 6 and the horizontal frame section elements 7 are bolted to each other so as to form the frame 2.

Figure 2:
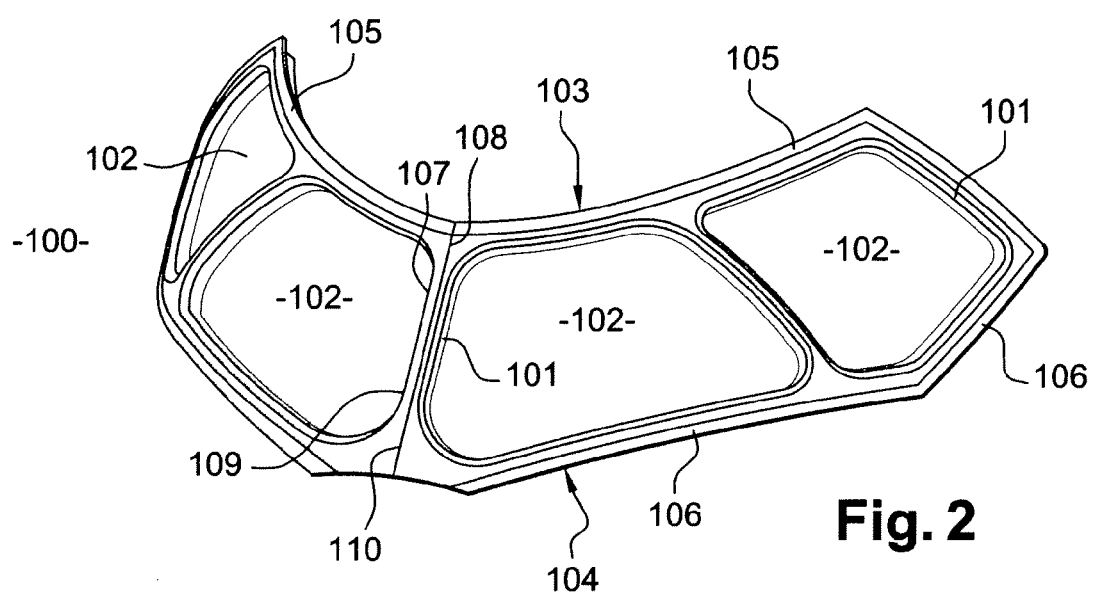
FIG. 2: a schematic representation of an aircraft windscreen frame according one embodiment.

Such an aircraft cockpit 1 could also be fitted with a windscreen frame 100 according to the disclosed embodiment such as is represented in FIG. 2.

In the example represented by FIG. 2, the windscreen frame is fitted with five vertical mountings 101 permitting the subdivision of the opening in the wall of the cockpit into four holes 102, each designed to be closed by a glass.

The frame 100 is in addition fitted with an upper horizontal frame section 103 and a lower horizontal frame section 104. Each horizontal frame section 103, 104 is formed by several elements, or sections, of horizontal frame section, respectively upper 105 and lower 106.

A top end 107 of each vertical mounting 101 is integral to an upper frame section element 105, at the level of an upper junction point 108. Similarly, a lower end 109 of each of the vertical mountings 101 is integral to a lower frame section element 106, at the level of a lower junction point 110.

The windscreen frame 100 according to a disclosed embodiment forms a grouped single unit, since there are no fixation parts between the vertical mountings 101 and the horizontal frame section elements 105, 106 forming the frame. The frame 100 is in preference formed by moulding, directly in one single piece. It can also be formed of two moulded sub groups, for example right and left, each comprising holes 102, horizontal frame section elements and vertical mountings. The two sub groups are then solidly connected to each other, for example using overmoulding or splinting.

The glasses designed to be fitted in the holes 102 are for example double curved and bolted, but can also be clipped using a window pane retainer. The double curve permits the avoidance of sharp points in the structure, which are particularly detrimental to composite structures which have a low resistance to distortion. Furthermore this type of curved glass permits a reduction of noise and aerodynamic drag. However, although the results in terms of mass, noise and drag are less interesting, it is possible to fit the holes 102 with flat panes.

Figure 3:
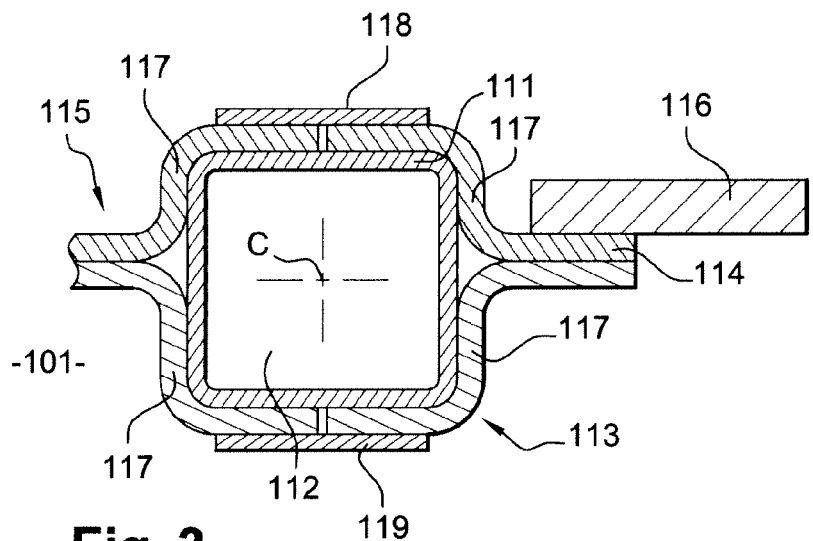
FIG. 3: a cross section view of a vertical mounting of a windscreen frame according to one embodiment.
Figure 4:
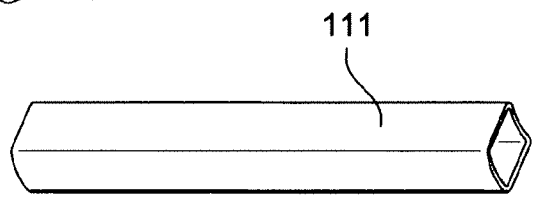
FIG. 4: a schematic representation of a vertical central bar belonging to a vertical mounting according to one embodiment.

FIG. 3 represents a cross section view of a vertical mounting 101 according to a disclosed embodiment. The vertical mounting 101 has a square section. It is also possible to make a vertical mounting with a circular, rectangular, oval or other section.

The vertical mounting 101 comprises a vertical central bar 111 set in a housing 112 in an internal space of the vertical mounting 101. The vertical bar 111 runs parallel to the longitudinal axis of the vertical mounting 101. The central bar 111, is for example a hollow bar with a square section, extending over the entire length of the vertical mounting 101. The length is understood to mean the dimension of the vertical mounting between the two lower 104 and the two upper 103 horizontal frame sections. The central bar 111 rigidities in flexion the vertical mounting 101 and ensures the continuance of the said mounting 101.

The housing 112 is bordered by a glass support structure 113. An internal outline of the glass support structure 113 follows an external outline of the central bar 111. Internal and external are understood respectively to mean directed towards the centre C of the vertical mounting 101, and directed towards the exterior of the vertical mounting 101.

The glass support 113 is fitted with two lateral extensions, respectively right 114 and left 115 on FIG. 3, on which the glasses of the windscreen are designed to sit.

In the example represented in FIG. 3, the glass support structure 113 comprises four flanges 117 each presenting a Z-shaped cross section. More precisely, two flanges 117 frame the left side of the vertical bar 111, two other flanges 117 following the right side. The left flanges 117 are positioned so that the lower branch of the Z of the cross section of the upper flange 117 is adjacent to the upper branch of the Z of the cross section of the lower flange, these two adjacent branches forming the left extension 115. The central branches of the Z of the cross section of the two left flanges 117 are adjacent to the left side of the central bar 111. The upper branch of the Z of the cross section of the upper flange 117 is adjacent to a left portion of the upper side of the vertical bar 111. The lower branch of the Z of the cross section of the lower flange is itself, adjacent to a left portion of the lower side of the vertical bar 111.

The upper or lower surfaces of the flanges 117 which surround the upper and lower sides of the central bar 111 are held in position on the inside by the central bar 111 and on the outside by the skins respectively external 118 and internal 119. The internal 119 and external 118 skins are flat surfaces designed to rigidify in flexion the windscreen unit. The external skin of the frame is in addition coated by the skin of the cockpit 1. The skins 118, 119 also permitting cohesion between the external faces of the flanges 117, cohesion between the internal faces of these said flanges 117 being ensured by the central bar 111.

Each flange 117 is capable of taking up loads impacting on the glass 116 and also helps to provide rigidity to the vertical mounting 101.

Figure 5:
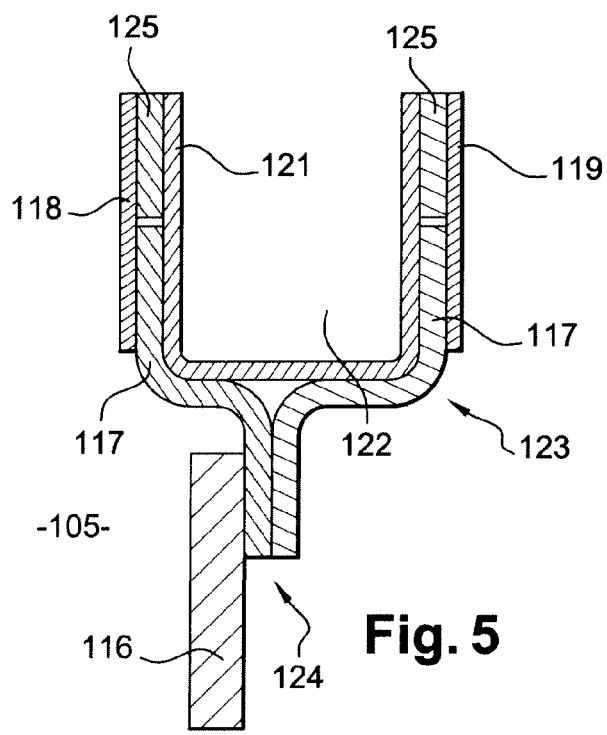
FIG. 5: a cross section view of a horizontal frame section of a windscreen frame according to one embodiment.
Figure 6:
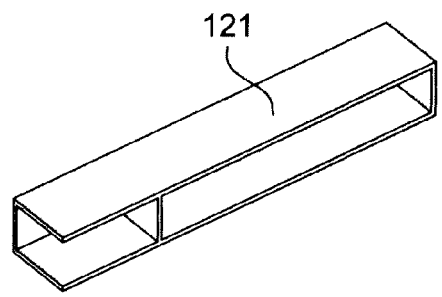
FIG. 6: a schematic representation of a central frame section longeron of the horizontal frame section according to FIG. 5.

FIG. 5 is a representation of a cross section view of an upper horizontal frame section element 105. Of course, this view could be that of a lower horizontal frame section element 106.

The horizontal frame section element 105 comprises a horizontal central longeron 121 set in a central housing 122 of the horizontal frame section element 105. The central housing 122 is bordered by the glass support structure 123 of the horizontal frame section element 105. The horizontal longeron runs parallel to the longitudinal axis of the horizontal frame section 105.

The horizontal central longeron 121 forms a bar with a U-shaped section. Of course, the longeron 121 could also have a closed section, such as a rectangular section. The horizontal longeron 121 rigidifies the horizontal frame section element 105 as well as the edge of the hole 102 which the frame section element 105 is framing.

As with for the vertical mounting 101, the glass support structure 123 of the horizontal frame section element 105 incorporates flanges 117 which have a Z-shaped cross section.

More precisely, the two flanges are facing each other, the lower branches of the Z cross sections being adjacent to each other, whereas the upper branches are separated from each other by the length of the two central branches. The housing 122 is therefore an open housing, bordered laterally by the upper branches of the Z cross sections and at the bottom by the central branches, but opening towards the outside at the top.

The extension 124 formed by the two lower adjacent branches of the Z cross sections of the flanges 117 is designed to support the glass pane 116 of the windscreen. In the example represented by FIG. 5, the horizontal frame section element being a lower frame section element 105, the extension 124 is directed downwards. A similar extension is directed upwards in a lower horizontal frame section element 106.

In the case where the upper branch of the Z cross section of the flange 117 has a length which is less than the length of the longeron wall 121 which it is framing, it is possible to make provision for a frame section liner 125, which runs into the extension of the said upper branch.

It is also possible to encase the surface of the flanges 117 with skins respectively external 118 and internal 119. There again, the external 118 and internal 119 skins form an active coating, designed to coat the frame section element 105 at the point of its liaison with the cockpit wall and ensure their consistency.

Figure 7:
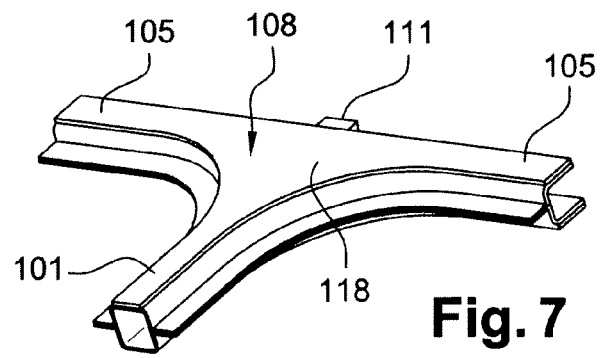
FIG. 7: a schematic representation of a section of the windscreen frame according to the one embodiment at the level of the junction point.

FIG. 7 represents an enlargement of FIG. 2 at the level of the upper junction point 108. Of course, the structure of the lower junction point 110 is identical. The junction point as is described above is representative of the group of junction points 108, 110 of the frame 100 according to a disclosed embodiment.

The part forming the glass support flange has a special shape at the level of the junction point 108. In effect, a section of the flange 117 of a horizontal frame section element 105 meets a section of flange 117 of a second adjacent horizontal frame section element 105 and a section of flange 117 of a vertical mounting 101. Thus, four sections of flanges 117, belonging to two distinct flanges 117, right and left in FIG. 9, meet at the level of the junction point 108.

Figure 9:
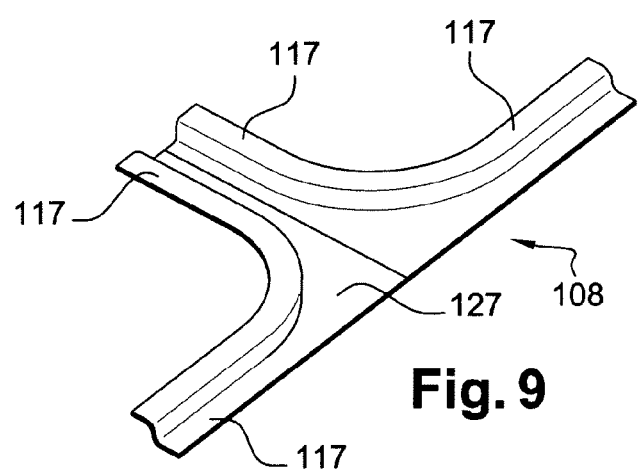

As can be seen in FIG. 9, each of the two flanges 117 has one of its Z section branches, opposite to the branch designed to form a glass support extension 115, 114, 124 (FIGS. 3, 5), where the surface enlarges so as to merge with the surface also enlarged of the branch corresponding to the adjacent flange 117. The corresponding enlarged surfaces of the flanges 117 therefore meet to form a basin 127.

Figure 10:
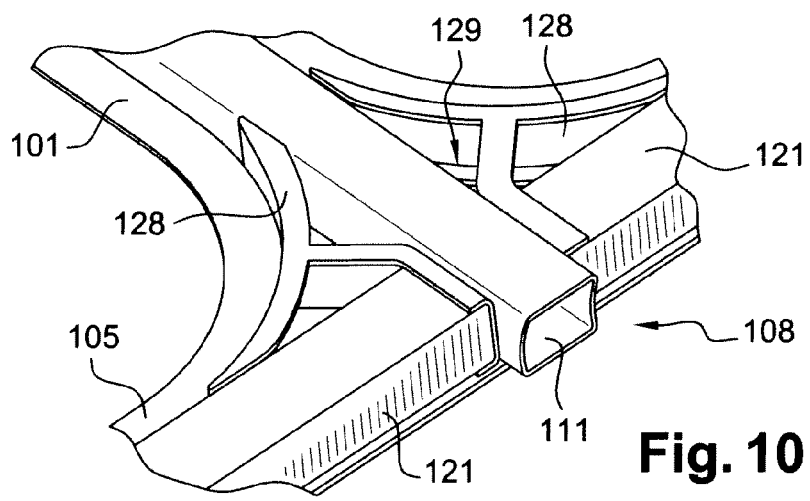
FIG. 10: a schematic representation of the internal structure of the junction point according to FIG. 7.

As can be seen on FIG. 10, the internal space 129 between the two external and internal basins 127 of the junction point 108 (a single basin is represented in FIG. 10) is designed to receive the extension of the vertical central bar 111 of the vertical mounting 101, as well as the central frame section longeron 121 of the two right and left frame section elements 105. The vertical bar 111 crosses the junction point 108, at the level of the junction between the two frame section elements 105. The central frame section longeron 121 is therefore interrupted so as to allow the passage of the vertical central bar 111.

The internal space 129 inside the basins 127 can also receive one or several stiffeners 128 designed to rigidity the junction point 108.

In the example represented in FIG. 10, the junction point 108 incorporates two stiffeners 128 positioned in the internal space 129 so as to come into contact, in one part, against the central bar 111 and, in another part, against the internal wall of the junction point 108. In preference, the two stiffeners 128 are positioned on each side of the central bar 111.

Figure 8:
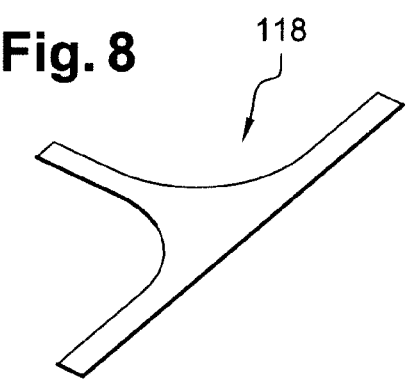
FIGS. 8 and 9: schematic representations of two elements of the junction point of FIG. 7.

The stiffener 128 is a tripod. Two legs of the tripod 128 are held between the vertical central bar 111 and respectively a longeron 121 or an internal wall of the flange 117 at the level of the junction point 108, the third leg being held between a central frame section longeron 121 and the internal wall of the flange 117 at the level of the junction point 108. In another example of an embodiment, provision can be made to position a sponge core in the place of the tripod, so as to fill in the space between the central bar, the central frame section longeron 121 and the internal walls of the junction point 108. FIG. 8 is a schematic representation of a portion of external skin 118 designed to coat, in one part, the central bar 101 and, in another part, two adjacent frame section elements 105 at the level of a junction point 108. There again, the external skin 118 follows a general outline of the windscreen frame, so as to ensure continuity between the windscreen frame 100 and the skin of the cockpit in which the said frame is intended to be fitted.

A disadvantage of flanges 117 which have a Z-shaped section such as are represented in FIGS. 3, 5 and 9 is that the end forming a support plate 114, 115 presents a section which is susceptible to the phenomena of distortion during impacts upon the glass 116, such as birdstrike or fuselage pressurisation.

Figure 11:
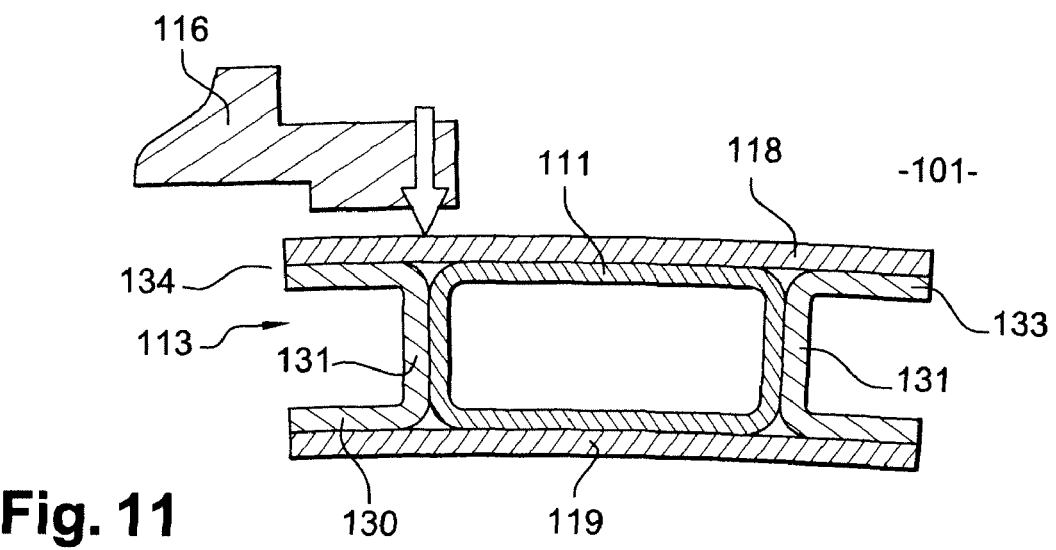
FIG. 11: a cross section view of a vertical mounting according to a second example of an embodiment of a windscreen frame according to the one embodiment.
Figure 12:
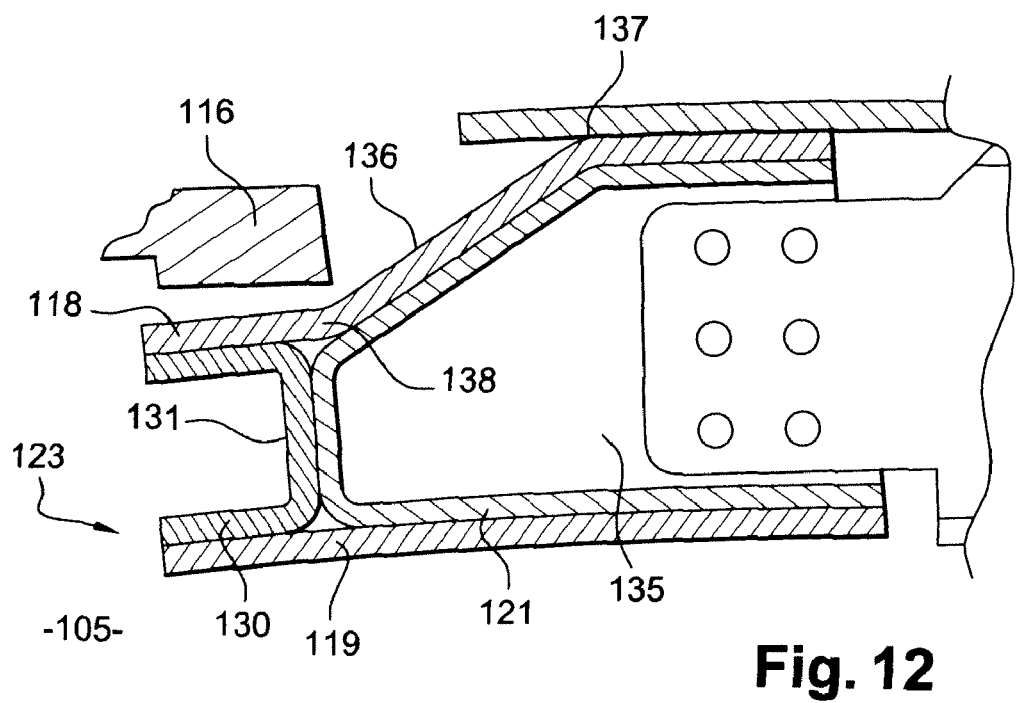
FIG. 12: a cross section view of a horizontal frame section according to a second example of an embodiment of a windscreen frame according to the one embodiment.

FIGS. 11 and 12 represent a second example of an embodiment of a vertical mounting 101 (FIG. 12) and a horizontal frame section element 105 (FIG. 13), better adapted to the load take up of birdstrike. As can be seen on FIG. 11, the vertical mounting 101 is fitted with a central bar 111 with a rectangular section and with two flanges 130 belonging to the glass support structure 113.

The flanges 130 have an inverted U-shaped cross section. More precisely, the glass support structure 113 is fitted with two inverted U-shapes positioned on each side of the central bar 111, so that the base 131 of each of the U-shapes 130 encloses a short side of the rectangular central bar 111. The branches of the U-shaped section form the respective right 133 and left 134 extensions, running towards the outside, on the right and left of the central bar 111. The extensions 133, 134 are designed to support the glass 116 of the windscreen. Of course, the flanges 130 could also, in another example of an embodiment, have a closed section, such as a rectangular section.

Advantageously, the external 118 and internal 119 skins run along the length of the internal faces of the branches of the U and the two long sides of the central rectangular bar 111. The coating skins 118, 119 forming, at the level of the U branches a plate against which the glass 116 is designed to sit. Thereby, the plate designed to receive the glass 116 no longer presents an angle which could be subject to distortion. The glass 116 is supported by the flange 130 and by the overlaid skin 118, 119.

As is represented on FIG. 12, the same principle can be applied to the frame section element 105. There again the glass support structure 123 incorporates a flange 130 where the cross section generally has a U-shape. The flange 130 is positioned so that the base 131 of the U 130 comes into contact with a wall of the central frame section longeron 121, whereas each of the branches of the U form an extension coated by the internal 119 and external 118 skins. The overlaid skin 118, 119 and branch of the U is designed to receive the glass 116.

Advantageously, since the composite performs badly not only in the curves but also outside of its plane, the sill of the glass 116 is designed and positioned so that the load uptake of birdstrike is transmitted as directly as possible into the normal parts of the skin 118, 119, that is to say the flange core, the bars and the frame section longerons over which the glass is directly positioned, which thus move in their plane.

In preference, as is represented in FIG. 12, the section of the framework supporting the glass 116 is flattened in order to pass under the glass 116. For this, a slope 136 is created on the peripheral zone of the glass 116, to go from a theoretical aerodynamic profile to a parallel surface staggered in thickness of the glass towards the interior. The slope 136 must be slight enough to ensure that the curves which start at 137 and end at 138 are large and open enough to not be affected by the phenomena of distortion. This zone comprising the slope 136 is rigidified by stiffening ribs 135 which take up the stiffening of the cap and surrounding frames, and which transfer the normal loads to the skin according to one working mode in the plane.

Advantageously, the windscreen frame according to a disclosed embodiment is made in a composite material of thermosetting resin.

In preference, to create the various elements of the windscreen 100 according to a disclosed embodiment, preforms are initially created which are then coinjected with resin in the mould to form cohesion between the group of preforms to form the desired windscreen frame.

Thus, it is possible to create preforms of horizontal frame section elements, as well as preforms of vertical mountings which are subsequently placed in a mould to be amalgamated using compacting powder or by the injection of resin.

The preform of a horizontal frame section element comprises a horizontal central longeron made, for example, by placing fibres around a core of a rectangular section, the said core being to advantage removed once the windscreen frame according to a disclosed embodiment is made.

The preforms of the glass support structure are placed partly below and partly above the vertical central bar, so as to enclose it once the coinjection has be done. Similarly, if it is decided to coat the whole of the vertical mounting with an external skin and an internal skin, the process is the same in order that the external and internal skins enclose the glass support flanges.

Advantageously, the positioning of the fibres in the central bar intended to ensure the rigidity in flexion of the vertical mounting has a drape forming which is essentially at zero degrees. The glass support structures, which must take up the loads of pressurisation and birdstrike on the glass, have a drape forming positioned according to the tangent at the edge of the hole, so as to confer a rigidity to the glass support which is equal whatever the position in question on the perimeter of the glass. Since the glass supports tolerate torsion and distortion, the fibres are positioned to advantage at +/−60°, or +/−45° with part of the fibres also at 90°. The external and internal skins must create cohesion between the external faces and the right and left sections of the glass supports, their fibres are positioned at 90° in relation to the direction of the vertical mounting.

The creation of preforms of horizontal frame section elements reply to the same requirements and therefore take up the same general positioning principle of fibres according to the stresses which must be taken up by the various parts. Concerning the frame section liner, the tissue of the preform is to advantage positioned at zero degrees, that is to say in relation to the direction of the frame section longeron.

Generally, the drape forming of fibres is adapted to the functions which the elements that they are forming must ensure. Injection techniques such as RTM or LRI are used to advantage. It is also possible rather than creating an assembly of several preforms, to create one unique preform constituted by the direct setting of dry fibres.

Tissue and resin are the fibres used to advantage, these ensuring a good resistance to impact. For example, concerning tissue, a tissue is used called "interlock" which has the particularity of offering a resistance, that is to say a resistance to impact, which is high due to its weave.

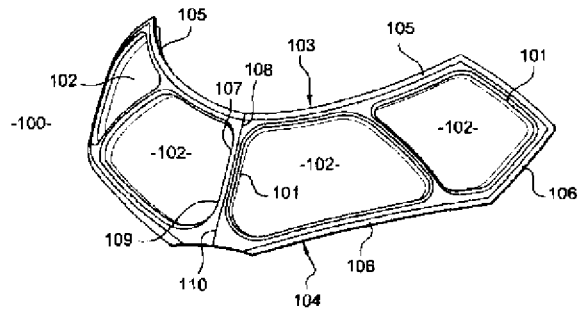
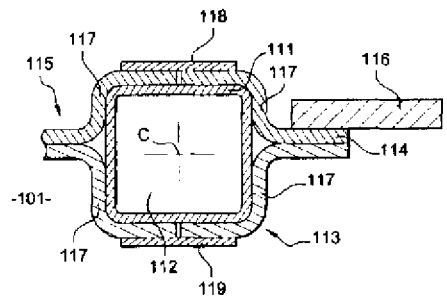

The invention claimed is:

1. A composite aircraft windscreen frame for a windscreen, designed to hold a windscreen in an opening in a wall, the frame comprising at least one upper horizontal frame section element, at least one lower horizontal frame section element and at least one vertical mounting, wherein said frame is a single unit and in that at least one end of the vertical mounting is integral at a level of a junction point with at least one of said upper horizontal frame section element and said lower horizontal frame section element, a vertical central bar of the vertical mounting running through said junction point; wherein the vertical mounting of the windscreen frame further comprises a glass support structure, the said vertical central bar being at least partially enveloped in the glass support structure; and two opposite faces of the vertical mounting are coated respectively by an external and internal skin, designed to extend along the wall in which the opening is situated.

2. A windscreen frame according to claim 1, wherein said frame comprises at least one stiffener housed in an internal space of the junction point, so as to be applied against the vertical central bar and on the internal wall of the junction point.

3. A windscreen frame according to claim 2, wherein said frame incorporates two stiffeners framing the vertical central bar.

4. A windscreen frame according to claim 1, wherein at least one element of at least one of said upper horizontal frame section and said lower horizontal frame section comprises a horizontal central longeron and a glass support structure, the said horizontal central longeron being at least partially enveloped in the glass support structure.

5. A windscreen frame according to claim 4, wherein two opposite faces of at least one of said upper horizontal frame section and said lower horizontal frame section are coated respectively by an external and internal skin, designed to extend along the wall in which the opening is situated.

6. A windscreen frame according to claim 1, wherein the glass support structure comprises at least one flange having a Z-shaped cross section, one branch of the Z forming a support plate on which the windscreen is designed to sit.

7. A windscreen frame according to claim 1, wherein the glass support structure comprises at least one flange having a U-shaped cross section, one branch of the U forming a support plate on which the windscreen is designed to sit.

8. A windscreen frame according to claim 7, wherein surfaces of the flange are coated respectively by [said external skin and said internal skin, designed to extend along the wall in which the opening is formed, and at least one of the external and the internal skin forming an auxiliary support plate on which the windscreen is designed to sit.

9. A windscreen frame according to claim 1, wherein the glass support structure comprises at least one flange having a closed cross section, one branch of the section forming a main support plate on which the windscreen is designed to sit.

10. An aircraft cockpit comprising at least one composite aircraft windscreen frame according to claim 1.

11. A composite aircraft windscreen frame for a windscreen, designed to hold a windscreen in an opening in a wall, the frame comprising at least one upper horizontal frame section element, at least one lower horizontal frame section element and at least one vertical mounting, wherein said frame is a single unit and in that at least one end of the vertical mounting is integral at a level of a junction point with at least one of said upper horizontal frame section element and said lower horizontal frame section element, a vertical central bar of the vertical mounting running through said junction point; wherein at least one element of at least one of said upper horizontal frame section and said lower horizontal frame section comprises a horizontal central longeron and a glass support structure, the said horizontal central longeron being at least partially enveloped in the glass support structure; wherein two opposite faces of at least one of said upper horizontal frame section element and said lower horizontal frame section element are coated respectively by an external and internal skin, designed to extend along the wall in which the opening is situated.

* * * * *

UNITED STATES PATENT AND TRADEMARK OFFICE
CERTIFICATE OF CORRECTION

| | | |
|---|---|---|
| PATENT NO. | : 7,942,369 B2 | Page 1 of 1 |
| APPLICATION NO. | : 11/854677 | |
| DATED | : May 17, 2011 | |
| INVENTOR(S) | : Benjamin Mahieu et al. | |

It is certified that error appears in the above-identified patent and that said Letters Patent is hereby corrected as shown below:

Title Page, Col. 1, Below "(65) Prior Publication Data", insert -- (30) Foreign Application Priority Data Sep. 13, 2006 (FR) 2006-53714 --.

Column 10, line 33, Claim 8, delete "[said" and insert -- said --, therefor.

Column 10, line 38, Claim 9, delete "claim 1 ," and insert -- claim 1, --, therefor.

Column 10, line 64, insert -- 12. A method of production of the frame for a windscreen of claim 1, the method comprising:

making preforms in a composite material, representing sections of the horizontal frame section elements and sections of the vertical mountings;

positioning the preforms in a mould;

coinjecting the group of preforms in such a way as to obtain a single unit windscreen frame.

13. The method of production of claim 16, further comprising:

positioning an internal skin against a wall of the mould designed to receive the preforms, before positioning the said preforms in the said mould, then coating the single unit windscreen with an external skin, so that the internal and external skins encase the preforms in the mould, then performing coinjection so as to form a single unit in which the interior and exterior skins encase the horizontal frame section elements and the vertical mountings. --, therefor.

Signed and Sealed this
Seventh Day of February, 2012

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,942,369 B2 |
| APPLICATION NO. | : 11/854677 |
| DATED | : May 17, 2011 |
| INVENTOR(S) | : Benjamin Mahieu et al. |

It is certified that error appears in the above-identified patent and that said Letters Patent is hereby corrected as shown below:

Delete the title page and substitute therefor the attached title page showing the corrected number of claims in patent.

Title Page, Col. 1, Below "(65) Prior Publication Data", insert -- (30) Foreign Application Priority Data Sep. 13, 2006 (FR) 2006-53714 --.

Column 10, line 33, Claim 8, delete "[said" and insert -- said --, therefor.

Column 10, line 38, Claim 9, delete "claim 1 ," and insert -- claim 1, --, therefor.

Column 10, line 64, insert -- 12. A method of production of the frame for a windscreen of claim 1, the method comprising:

making preforms in a composite material, representing sections of the horizontal frame section elements and sections of the vertical mountings;

positioning the preforms in a mould;

coinjecting the group of preforms in such a way as to obtain a single unit windscreen frame.

13. The method of production of claim 16, further comprising:

positioning an internal skin against a wall of the mould designed to receive the preforms, before positioning the said preforms in the said mould, then This certificate supersedes the Certificate of Correction issued February 7, 2012.

Signed and Sealed this
Twenty-eighth Day of February, 2012

David J. Kappos
*Director of the United States Patent and Trademark Office* coating the single unit windscreen with an external skin, so that the internal and external skins encase the preforms in the mould, then performing coinjection so as to form a single unit in which the interior and exterior skins encase the horizontal frame section elements and the vertical mountings. --, therefor.

CERTIFICATE OF CORRECTION (continued)

(12) United States Patent
Mahieu et al.

(10) Patent No.: US 7,942,369 B2
(45) Date of Patent: May 17, 2011

(54) WINDSCREEN FRAME AND A METHOD OF PRODUCTION FOR A WINDSCREEN FRAME

(75) Inventors: Benjamin Mahieu, Toulouse (FR); Bruno Cacciaguerra, Clermont le Fort (FR); Louis Peltier, Ramonville Saint Agne (FR)

(73) Assignee: Souriau, Versailles (FR)

(*) Notice: Subject to any disclaimer, the term of this patent is extended or adjusted under 35 U.S.C. 154(b) by 751 days.

(21) Appl. No.: 11/854,677

(22) Filed: Sep. 13, 2007

(65) Prior Publication Data
US 2008/0073931 A1    Mar. 27, 2008

(51) Int. Cl.
*B64C 1/14*    (2006.01)

(52) U.S. Cl. ............... 244/129.3; 244/119; 244/121; 296/96.21; 52/656.5

(58) Field of Classification Search ............ 244/129.3, 244/121, 119, 120, 129.1; 296/96.21, 84.1, 296/201, 190.1; 52/204.1, 204.5, 204.6, 52/208, 656.2
See application file for complete search history.

(56) References Cited

U.S. PATENT DOCUMENTS

| | | | | |
|---|---|---|---|---|
| 2,464,696 | A | * | 3/1949 | Lelong ............ 296/201 |
| 2,547,799 | A | * | 4/1951 | Wernig ............ 296/96.21 |
| 2,827,671 | A | | 3/1958 | Martin |
| 3,259,345 | A | * | 7/1966 | Martignoni et al. ...... 244/129.3 |
| 3,429,530 | A | * | 2/1969 | Hertel ............ 244/129.3 |
| 4,004,388 | A | | 1/1977 | Stefanik |
| 4,973,103 | A | * | 11/1990 | Imajyo et al. ........ 296/203.04 |
| 5,037,041 | A | * | 8/1991 | Unterhirzenberger ....... 244/120 |
| 5,299,396 | A | * | 4/1994 | Rap et al. ............ 52/90.1 |
| 5,362,120 | A | * | 11/1994 | Cornille, Jr. ........ 296/203.01 |
| 5,927,364 | A | * | 7/1999 | Zacher et al. ............ 160/90 |
| 6,736,352 | B2 | * | 5/2004 | Bladt et al. ............ 244/129.3 |
| 2005/0082432 | A1 | | 4/2005 | Nordman |
| 2006/0080914 | A1 | * | 4/2006 | Wood et al. ............ 52/204.5 |

FOREIGN PATENT DOCUMENTS

DE    10 2004 012 374 A1    10/2005
WO    2004011249 A1    2/2004

* cited by examiner

*Primary Examiner* — Joshua J Michener
(74) *Attorney, Agent, or Firm* — Perman & Green, LLP

(57) ABSTRACT

A windscreen frame, and a method of production for a windscreen frame, designed to hold a windscreen in an opening in a wall, the frame including at least one upper horizontal frame section element, at least one lower horizontal frame section element and at least one vertical mounting, characterized in that it is a single unit in composite material.

13 Claims, 4 Drawing Sheets